US012436309B2

(12) United States Patent
Cozon et al.

(10) Patent No.: US 12,436,309 B2
(45) Date of Patent: Oct. 7, 2025

(54) CIRCULAR DOWNHOLE ULTRASONIC PHASED ARRAY

(71) Applicant: Schlumberger Technology Corporation, Sugar Land, TX (US)

(72) Inventors: Jean-baptiste Cozon, Clamart (FR); Orland Guedes, Clamart (FR); Roel Van Os, Clamart (FR); Stephane Guimont, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 181 days.

(21) Appl. No.: 18/338,562

(22) Filed: Jun. 21, 2023

(65) Prior Publication Data

US 2023/0333275 A1 Oct. 19, 2023

Related U.S. Application Data

(62) Division of application No. 17/215,120, filed on Mar. 29, 2021, now Pat. No. 11,719,845.

(30) Foreign Application Priority Data

Apr. 3, 2020 (EP) ..................................... 20315106

(51) Int. Cl.
  *G01V 1/52* (2006.01)
  *G01N 29/22* (2006.01)
(52) U.S. Cl.
  CPC .............. *G01V 1/52* (2013.01); *G01N 29/225* (2013.01); *G01N 29/227* (2013.01); *G01V 1/523* (2013.01);
(Continued)

(58) Field of Classification Search
  CPC .. G01V 1/52; G01V 2001/526; G01N 29/227; G01N 29/265
  See application file for complete search history.

(56) References Cited

U.S. PATENT DOCUMENTS 8,286,475 B2 * 10/2012 Nakajima .............. G01V 1/186
  73/152.51
10,145,969 B2 * 12/2018 Moncho ................... G01V 1/52
(Continued)

FOREIGN PATENT DOCUMENTS

WO 03083466 A2 10/2003

*Primary Examiner* — Daniel L Murphy
*Assistant Examiner* — Amie M Ndure
(74) *Attorney, Agent, or Firm* — Jeffrey D. Frantz

(57) ABSTRACT

A downhole tool having an acoustic transducer for downhole measurements. A backing is in contact with an inner surface of the transducer. A first structure is coupled to a first housing. A second structure is coupled to a second housing. A member includes first, second, and third portions. The first portion is coupled to the first structure. The second portion is coupled to the second structure. At least one of the first and second structures is coupled to the member and has a degree of freedom relative to the member. The third portion extends longitudinally through the backing between the first and second portions such that compressional forces on the first and second housings are transferred through the first and second structures and the backing. A canister contacts an outer surface of the transducer and exerts radial forces on the transducer when exposed to pressures higher than atmospheric pressure.

20 Claims, 4 Drawing Sheets

(52) U.S. Cl.
CPC .. *G01V 2001/526* (2013.01); *G01V 2210/121* (2013.01); *G01V 2210/1299* (2013.01); *G01V 2210/1429* (2013.01)

(56) References Cited

U.S. PATENT DOCUMENTS

| | | | |
|---|---|---|---|
| 10,416,330 B2* | 9/2019 | Steinsiek | G01V 1/40 |
| 2009/0183941 A1* | 7/2009 | Pabon | G01V 1/523 |
| | | | 181/102 |
| 2011/0080806 A1* | 4/2011 | Normann | G01V 1/46 |
| | | | 367/35 |
| 2015/0198733 A1* | 7/2015 | Lie | E21B 47/107 |
| | | | 367/138 |
| 2017/0045633 A1* | 2/2017 | Moncho | E21B 49/00 |
| 2021/0311224 A1 | 10/2021 | Cozon | |

\* cited by examiner

US 12,436,309 B2

CIRCULAR DOWNHOLE ULTRASONIC PHASED ARRAY

This application is a divisional of U.S. patent application Ser. No. 17/215,120, entitled "Circular Downhole Ultrasonic Phased Array," filed Mar. 29, 2021, which claims priority to and the benefit of a European Patent Application having Application No. EP 20315106.3, filed Apr. 3, 2020, which is incorporated by reference herein.

BACKGROUND OF THE DISCLOSURE

Ultrasonic downhole imaging tools are used in oil and gas exploration and production (E&P) in both cased and uncased ("open") boreholes. For example, when utilized in cased boreholes, such ultrasonic imaging may be performed to inspect the casing and the cement securing the casing in the borehole. When utilized in open boreholes, ultrasonic imaging may be performed to obtain an image of the borehole surface, such as to identify vugs, fractures, texture, and acoustic properties of the subterranean formation penetrated by the borehole.

Ultrasonic transducers of such imaging tools are generally pressure-compensated in order to be able to withstand the increased pressure differential between the surface and the bottom of the borehole. Therefore, acquisition electronics and the transducers of the imaging tools are disposed in an oil-filled cavity electrically connected to the rest of the tool via bulk connectors, such as described in U.S. Pat. No. 8,286,475, the entire disclosure of which is hereby incorporated herein by reference.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a downhole acoustic measurement tool that includes at least one transducer for emitting acoustic excitation signals and/or receiving echo signals to perform downhole measurements. The downhole acoustic measurement tool also includes a backing in contact with an inner surface of the at least one transducer, a first structure mechanically coupled to a first housing, and a second structure mechanically coupled to a second housing. The downhole acoustic measurement tool also includes a longitudinally extending member that includes a first portion, a second portion, and a third portion. The first portion is mechanically coupled to the first structure. The second portion is mechanically coupled to the second structure. At least one of the first and second structures is mechanically coupled to the member and thereby has a longitudinal degree of freedom relative to the member. The third portion extends longitudinally through the backing between the first and second portions such that compressional longitudinal forces experienced by the first and second housings are transferred through the first and second structures and the backing.

The present disclosure also introduces an apparatus including a downhole acoustic tool that includes at least one transducer for emitting acoustic excitation signals and/or receiving echo signals to perform downhole measurements, a backing in contact with an inner surface of the at least one transducer, and an acoustically transparent canister forming an external surface of the downhole acoustic tool. The canister contacts an outer surface of the at least one transducer so as to exert radial forces on the at least one transducer when placed in an environment having a pressure at or higher than atmospheric pressure.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numbers and/or letters in the various examples. This repetition is for simplicity and clarity and does not in itself dictate a relationship between the various embodiments and/or configurations discussed. Moreover, the description of a first feature in contact with a second feature in the description that follows may include implementations in which the first and second features are in direct contact, and may also include implementations in which additional features may interpose the first and second features, such that the first and second features may not be in direct contact.

Figure 1:
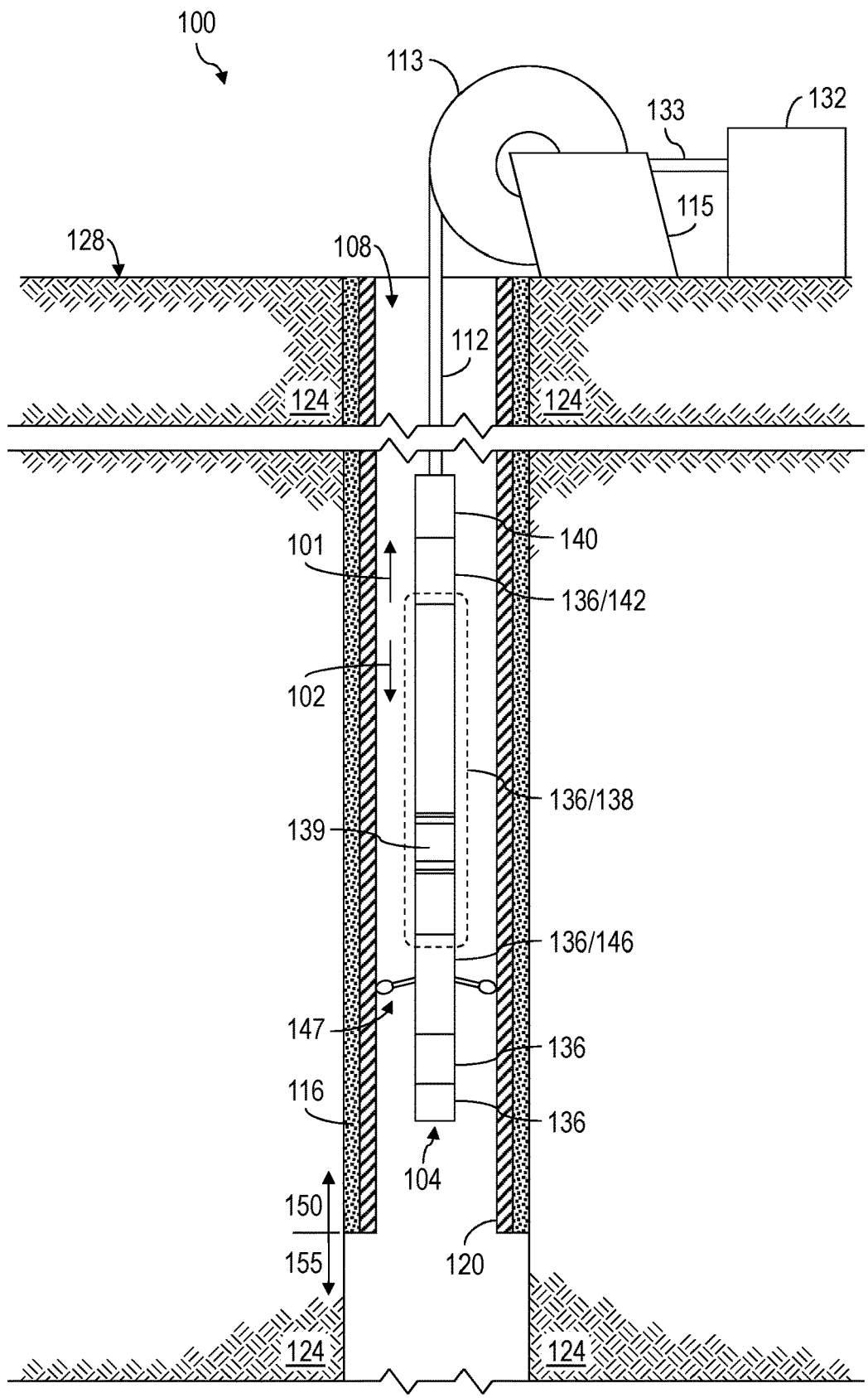
FIG. 1 is a schematic view of at least a portion of an example implementation of apparatus according to one or more aspects of the present disclosure.

FIG. 1 is a schematic view of at least a portion of an example implementation of a wellsite system 100 to which one or more aspects of the present disclosure may be applicable. The wellsite system 100 may be onshore (as depicted) or offshore. In the example wellsite system 100 shown in FIG. 1, a toolstring 104 is conveyed in a borehole 108 via a wireline, slickline, and/or other conveyance means 112. The example wellsite system 100 may be utilized for evaluation of the borehole 108, cement 116 securing casing 120 within the borehole 108, a tubular (not shown) secured in the casing 120 (e.g., production services tubing), and/or a subterranean formation 124 penetrated by the borehole 108 in a cased section 150 and/or an open hole section 155. Although the majority of the wellbore 108 is depicted in FIG. 1 as being cased, a majority of the wellbore may be uncased ("open," without the casing 120 and cement 116).

The toolstring 104 is suspended in the borehole 108 from the lower end of the conveyance means 112. The conveyance means 112 may be a single- or multi-conductor slickline or wireline logging cable spooled on a drum 113 of a winch 115 at the surface 128 of the wellsite from whence the borehole 108 extends. The wellsite surface 128 is the generally planar surface of the terrain (i.e., Earth's surface), a floor of a rig (not shown) at the wellsite, or other equipment at the wellsite, which is perpendicularly penetrated by the borehole 108. Operation of the winch 115 rotates the drum 113 to reel in the conveyance means 112 and thereby pull the toolstring 104 in an uphole direction 101 in the borehole 108, as well as to reel out the conveyance means 112 and thereby move the toolstring 104 in a downhole direction 102 in the borehole 108. The conveyance means 112 may include at least one or more conductors (not shown) that facilitate data communication between the toolstring 104 and surface equipment 132 disposed at the wellsite surface 128, including through one or more slip rings, cables, and/or other conductors (schematically depicted in FIG. 1 by reference number 133) electrically connecting the one or more conductors of the conveyance means 112 with the surface equipment 132. The conveyance means 112 may alternatively transport the tool string without a conductor inside the cable but with at least one module that can autonomously acquire and/or process and/or store downhole measurements in downhole memory without human intervention or communication with the surface equipment 132.

Although not illustrated as such in FIG. 1, the winch 115 may be disposed on a service vehicle or a stationary skid/platform. The service vehicle or stationary skid/platform may also contain at least a portion of the surface equipment 132.

The toolstring 104 comprises a plurality of modules 136, one or more of which may comprise an elongated housing, mandrel, chassis, and/or structure carrying various electronic and/or mechanical components. For example, at least one of the modules 136 may be or comprise at least a portion of a device for measuring a feature and/or characteristic of the borehole 108, the casing 120, a tubular installed in the casing 120 (not shown), the cement 116, and/or the formation 124, and/or a device for obtaining sidewall or inline core and/or fluid (liquid and/or gas) samples from the borehole 108 and/or formation 124. Other implementations of the downhole toolstring 104 within the scope of the present disclosure may include additional or fewer components or modules 136 relative to the example implementation depicted in FIG. 1.

The wellsite system 100 also includes a data processing system that may include at least a portion of one or more of the surface equipment 132, control devices and/or other electrical and/or mechanical devices in one or more of the modules 136 of the toolstring 104 (such as a downhole controller 140), a remote computer system (not shown), communication equipment, and/or other equipment. The data processing system may include one or more computer systems or devices and/or may be a distributed computer system. For example, collected data or information may be stored, distributed, communicated to a human wellsite operator, and/or processed locally (downhole or at surface) and/or remotely.

The data processing system may, whether individually or in combination with other system components, perform the methods and/or processes described below, or portions thereof. For example, the data processing system may include processor capability for collecting caliper, acoustic, ultrasonic, and/or other data related to the evaluation of the cement 116, the casing 120, a tubular installed in the casing 120 (not shown), and/or the formation 124, according to one or more aspects of the present disclosure. Methods and/or processes within the scope of the present disclosure may be implemented by one or more computer programs that run in a processor located, for example, in one or more modules 136 of the toolstring 104 and/or the surface equipment 132. Such programs may utilize data received from the downhole controller 140 and/or other modules 136 and may transmit control signals to operative elements of the toolstring 104, where such communication may be via one or more electrical or optical conductors of the conveyance means 112. The programs may be stored on a tangible, non-transitory, computer-usable storage medium associated with the one or more processors of the downhole controller 140, other modules 136 of the toolstring 104, and/or the surface equipment 132, or may be stored on an external, tangible, non-transitory, computer-usable storage medium that is electronically coupled to such processor(s). The storage medium may be one or more known or future-developed storage media, such as a magnetic disk, an optically readable disk, flash memory, or a computer-readable device of another kind, including a remote storage device coupled over one or more wired and/or wireless communication links, among other examples.

As designated in FIG. 1 by reference number 138, at least one of the modules 136 may be or comprise a downhole ultrasonic measurement tool operable for acquiring acoustic measurements characterizing the borehole 108, the casing 120, a tubular installed in the casing 120 (not shown), the cement 116, and/or the formation 124. The downhole ultrasonic measurement tool 138 comprises a phased array 139 of acoustic transducers ("active elements") that may each be operated as an acoustic transmitter and/or receiver. Example implementations of the downhole ultrasonic measurement tool 138 within the scope of the present disclosure are described below.

As designated in FIG. 1 by reference number 142, another one (or more) of the modules 136 may be or comprise an orientation module permitting measurement of the azimuth of the downhole ultrasonic measurement tool 138. Such module 142 may include, for example, one or more of a relative bearing (RB) sensor, a gravity/acceleration sensor, a magnetometer, and a gyroscopic sensor.

As designated in FIG. 1 by reference number 146, another one (or more) of the modules 136 may be or comprise a centralizer module. For example, the centralizer module 146 may comprise an electric motor driven by a controller (neither shown) and/or other means for actively extending ("opening") and retracting ("closing") a plurality of centralizing arms 147. Although only two centralizing arms 147 are depicted in the example implementation shown in FIG. 1, other implementations within the scope of the present disclosure may have more than two centralizing arms 147. Extension of the centralizing arms 147 aids in urging the downhole ultrasonic measurement tool 138 to a central position within the casing 120, another tubular, or the borehole 108 being investigated by the downhole ultrasonic measurement tool 138. Implementations of toolstrings within the scope of the present disclosure may include more than one instance of the downhole ultrasonic measurement tool 138 and/or more than one instance of the centralizer module 146. The modules 136 may be conveyed in either or both of open-hole sections 150 and cased-hole sections 155, including implementations in which the centralizer module 146 and the phased array module 138 may be configured or configurable for use in either or both of the two sections. The toolstring 104 may also not comprise the centralizer module 146, or may comprise another type of centralizer module, such as a passive centralizer module.

Figure 2:
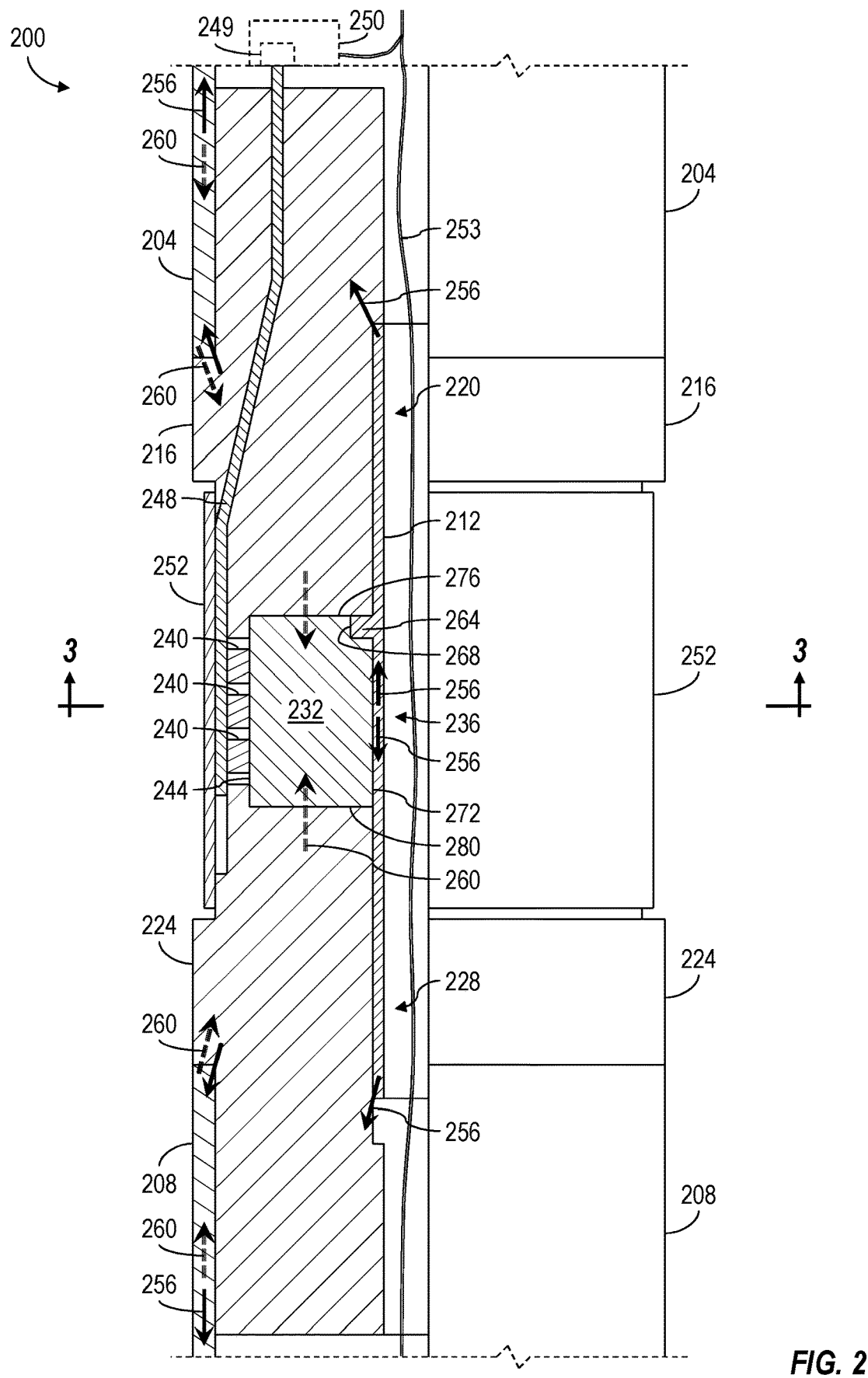
FIG. 2 is a sectional view of at least a portion of an example implementation of apparatus according to one or more aspects of the present disclosure.

FIG. 2 is a partial sectional view of at least a portion of an example implementation of a downhole ultrasonic measurement tool 200 according to one or more aspects of the present disclosure. The downhole ultrasonic measurement tool 200 shown in FIG. 2 is an example implementation of the downhole ultrasonic measurement tool 138 shown in FIG. 1.

The downhole ultrasonic measurement tool 200 comprises an upper housing 204 and a lower housing 208. The upper and lower housings 204, 208 each comprise or are connected to corresponding interfaces for connecting the downhole ultrasonic measurement tool 200 to adjoining modules of the tool string. The downhole ultrasonic measurement tool 200 also comprises a central member 212. The central member 212 is hollow to permit the passage of electrical conductors 253, such as wiring harnesses extending to other modules in the tool string. Alternatively, the central member 212 may be solid. In such implementations, no electrical conductors can pass, such as when the downhole ultrasonic measurement tool 200 is the last tool in the toolstring (i.e., a "bottom-only" tool).

An upper structure 216 connects the upper housing 204 to an upper portion 220 of the central member 212. A lower structure 224 connects the lower housing 208 to a lower portion 228 of the central member 212. Although the upper and lower structures 216, 224 are each depicted in FIG. 2 as a single, discrete component, this is merely for the purpose of clarity and ease of understanding on the present disclosure, it being understood that the upper and lower structures 216, 224 may each comprise two or more (perhaps several) discrete, interconnected components.

The downhole ultrasonic measurement tool 200 also comprises a backing 232. An intermediate portion 236 of the central member 212 extends longitudinally through the backing 232. A plurality of active elements 240 of a phased array are collectively disposed around a substantially cylindrical outer surface 244 of the backing 232. In the example implementation shown in FIG. 2, several active elements 240 are depicted at different longitudinal positions but the same azimuthal positions. However, in other implementations within the scope of the present disclosure, just one active element 240 may be disposed around the backing 232 at one particular azimuthal position. The active elements 240 independently and cooperatively emit acoustic excitation signals and receive echo signals to perform downhole acoustic measurements as described herein. The active elements 240 are mechanically and electrically coupled to one or more substantially cylindrical inner surfaces of one or more circuit boards 248. Each circuit board 248 includes or is connected to a connector 249 that is connected to electronics 250 that are situated inside the downhole ultrasonic measurement tool 200, such as in the upper housing 204. A canister 252 surrounds the active elements 240.

In the example implementation depicted in FIG. 2, the member 212 is a central member, but the position of the member 212 is not limited to the center of the downhole ultrasonic measurement tool 200. Further, FIG. 2 depicts the acoustic measurement tool as being a tool comprising a phased array transducer, but the downhole ultrasonic measurement tool 200 may have other configurations of transducers and still be within the scope of the present disclosure, including one transducer, a plurality of individual transducers separated from each other, and other example transducer implementations.

During use downhole, the downhole ultrasonic measurement tool 200 experiences axial (i.e., longitudinal) tension and compression forces that are transmitted to the upper and lower housings 204, 208. The tension forces are transmitted from the upper and lower housings 204, 208 to the central member 212 through the upper and lower structures 216, 224, respectively, as depicted in FIG. 2 by solid arrows (some being identified by reference number 256). The backing 232 is formed of a material with a low bulk modulus material, such as a mix of a polymer-type material (e.g., epoxy/silicone) that may be loaded with a certain volume-fraction of solid content (e.g., tungsten powder), or with a high bulk modulus material, such as a solid matrix material (e.g., metal) that may be filled with a filler material. The tensile strength of the material forming the backing 232 is generally not suitable for tension forces above various levels (e.g., above 1,000 Newtons (N)). The central member 212 is formed from steel, INCONEL, and/or other metals/metal alloys. As a consequence, the central member 212 is much more rigid than the backing 232, and the tensile axial forces 256 are transferred between the upper and lower housings 204, 208 via the central member 212 (through the upper and lower structures 216, 224) instead of through the backing 232, such that the backing 232 and the phased array components (including the active elements 240 and the one or more circuit boards 248) are not damaged by the axial loads.

The compression forces are transmitted from the upper and lower housings 204, 208 to the backing 232 through the upper and lower structures 216, 224, respectively, as depicted in FIG. 2 by dashed arrows (some being identified by reference number 260). Such arrangement distributes the forces so that the tool can withstand compression. In implementations in which the backing 232 is formed from a low bulk modulus material, the compressional force through the backing 232 also aids in balancing the radial compressional forces on the backing 232, such that its shape remains sufficiently stable so as to not damage the phased array (including the active elements 240 and the one or more circuit boards 248).

At least one of the upper and lower structures 216, 224 (e.g., the lower structure 224 in the example depicted in FIG. 2) has an axial (i.e., longitudinal) degree of freedom with respect to the central member 212 so that the compression forces are transmitted through the backing 232 and not through the central member 212 that may be damaged under compression. In other words, at least one of the upper and lower structures 216, 224 is able to move relative to the central member 212. Such movement is possible because the position of said structure is partially fixed relative to the position of the central member 212, i.e., there is no mechanical connection between the central member 212 and the structure that limits the movement of the structure along the tool axis under a compression movement. However, with regard to tensile forces, a mechanical feature (e.g., a nut or a shoulder) creates an end stop that limits the stroke of the structure under tension. In the example implementation depicted in FIG. 2, just the lower structure 224 has an axial degree of freedom, which permits maintaining a controlled distance between the active elements and the electronics 250 in the upper housing 204, although the upper structure 216 may also be configured so as to have an axial degree of freedom relative to the central member 212.

In the example implementation depicted in FIG. 2, the intermediate portion 236 of the central member 212 may comprise a flange and/or other protrusion 264 extending radially outward into a recess 268 in the otherwise substantially cylindrical inner surface 272 of the backing 232. Such protrusion 264 constrains the position of the upper structure 216 relative to the central member 212. An uphole end 276 of the backing 232 is contacted by the upper structure 216, while the lower structure 224 abuts a downhole end 280 of the backing 232 but is not constrained relative to the central member 212 under compression. Thus, when the backing 232 deforms under compression, the axial (i.e., longitudinal) position of the lower structure 224 may change.

Such architecture of the transducer permits avoiding having to compensate the tool 200 for pressure differentials without constraining or damaging the transducer. There is therefore no need for the conventional oil-filling procedures, nor complex multi-pin bulkhead connectors connecting the phased array to the rest of the downhole ultrasonic measurement tool 200.

Figure 3:
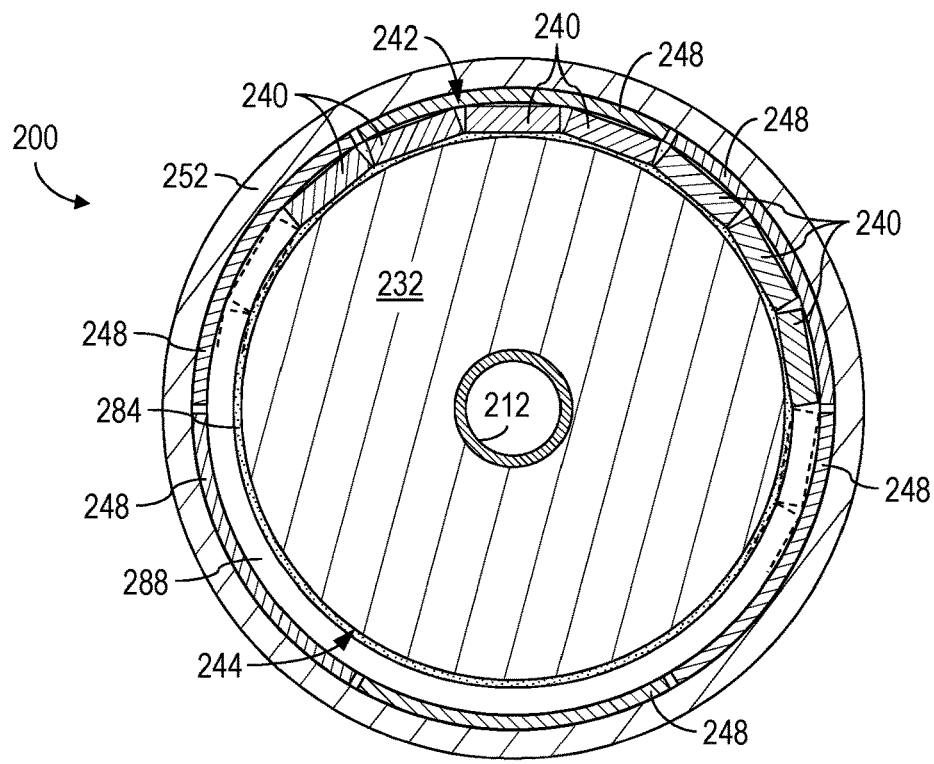
FIG. 3 is a sectional view of the apparatus shown in FIG. 2.

FIG. 3 is a sectional view of the downhole ultrasonic measurement tool 200. In the example implementation depicted in FIG. 3, the downhole ultrasonic measurement tool 200 comprises six circuit boards 248. However, other implementations within the scope of the present disclosure include downhole ultrasonic measurement tools comprising other numbers of circuit boards 248. The example implementation of the downhole ultrasonic measurement tool 200 shown in FIG. 3 includes a row of eighteen active elements 240. However, just seven of the active elements 240 are fully shown in FIG. 3, the remaining active elements 240 being hidden (removed from view) or shown by dashed lines for the sake of clarity.

The active elements 240 may be in direct contact with the outer cylindrical surface 244 of the backing 232, as shown in FIG. 2. However, as depicted in FIG. 3, a bonding layer 284 may interpose each active element 240 and the outer cylindrical surface 244 of the backing 232. FIG. 3 also depicts that a fill material 288 may be disposed (e.g., injected) into inter-element spaces 242 between the active elements 240. The fill material 288 may comprise materials similar to the backing 232, or simple polymer fillings without added solid content. However, the tool may not comprise the fill material 288, such as in implementations in which the active elements 240 are part of a same mechanical component where a plurality of sections are activated (e.g., polarized or plated) and separated with non-activated sections (e.g., non-conductive or not polarized).

Figure 4:
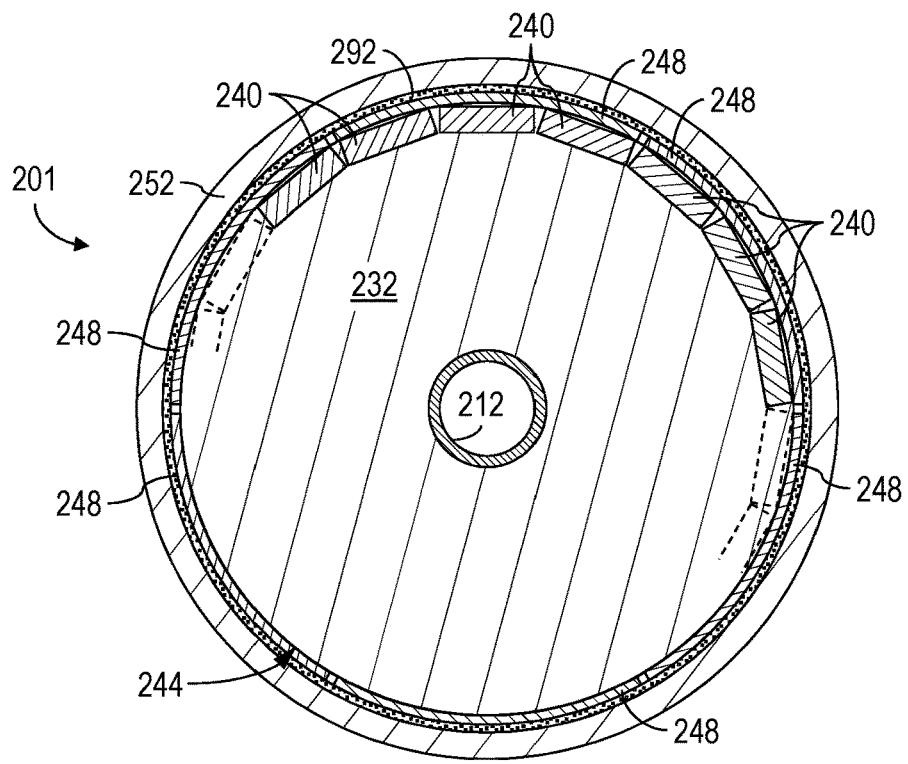
FIG. 4 is a sectional view of another example implementation of the apparatus shown in FIG. 3.

FIG. 4 is a sectional view of another example implementation of the downhole ultrasonic measurement tool 200 shown in FIG. 3, designated in FIG. 4 by reference number 201. The downhole ultrasonic measurement tool 201 depicted in FIG. 4 may be substantially similar (or perhaps identical) to the downhole ultrasonic measurement tool 200 shown in FIG. 3 except as described below.

FIG. 4 depicts that the active elements 240 may be embedded in the outer cylindrical surface 244 of the backing 232. For example, the active elements 240 may be fully embedded, such that they do not protrude outward beyond the outer cylindrical surface 244 of the backing 232, as depicted in FIG. 4. However, in other implementations within the scope of the present disclosure, the active elements 240 may be just partially embedded, such that they do protrude outward beyond the outer cylindrical surface 244 of the backing 232. In such implementations, the fill material 288 may be disposed between the protruding portions of the active elements 240, as described above with respect to FIG. 3.

FIG. 4 also depicts that an inclusion-resistant layer 292 may be disposed between the phased array (e.g., the one or more circuit boards 248) and the canister 252. The inclusion-resistant layer 292 (or acoustic coupling layer) may be or comprise silicone and/or other materials such as epoxy or polyurethane for example that may reduce the risk of inclusions (e.g., air) during assembly of the sensor, such as during the fitting of the canister 252 onto the active elements 240. The canister 252 may be made of metal, as will be described in the following example. Alternatively, the canister 252 may be made of an elastomer, such as a shrinkable elastomer or polymer, for instance high-temperature plastic such as polyether ether ketone (PEEK).

In the example implementations depicted in FIGS. 2-4, as well as other implementations within the scope of the present disclosure, the metal canister 252 protects the phased array components (e.g., the one or more circuit boards 248 and the active elements 240) from the corrosive environment of the borehole. Forming the canister 252 from metal (instead of the polymers conventionally used as a quarter-wavelength layer for ultrasonic transducer applications) also aids in preventing gas from migrating into the phased array from the outside environment. The metal canister 252 is thin enough to be acoustically transparent, yet also thick enough to support mechanical solicitations.

The canister 252 is configured to ensure very good contact with the active elements 240 so as to provide an acoustic path for ultrasonic signals and to prevent measurement-detrimental gas (air) inclusions into the phased array at pressures that are higher than ambient (i.e., atmospheric) pressure. Thus, whether or not the inclusion-resistant layer 292 exists, the canister 252 may be plastically deformed, in particular under high-pressure conditions, during assembly of the downhole ultrasonic measurement tool 200/201. The material of the canister 252 has ductility, elongation, and strength properties that permit a permanent deformation of the canister 252 that will remain present throughout the entire operating envelope of the phased array. The permanent deformation of the canister 252 exerts sufficient force on the phased array to ensure adequate acoustic contact between the backing 232, the active elements 240, and the inclusion-resistant layer 292 (when existing), even in ambient pressure conditions. In other implementations, the canister 252 may be made of shape memory alloy (SMA) material that changes in crystalline arrangement when subjected to extreme conditions, such as high temperature. The canister 252 may be configured so that, in its borehole configuration, it is in very good contact with the active elements 240. This may be achieved by placing the canister 252 in a first configuration, where it can be assembled around the active elements 240, and then subjecting the canister 252 to the above-mentioned extreme conditions so that it takes a second, more compact, configuration in which the very good contact is achieved. Thus, the proper functioning of the phased array is not dependent upon a certain pressure differential, in contrast to conventional acoustic transducers.

Figure 5:
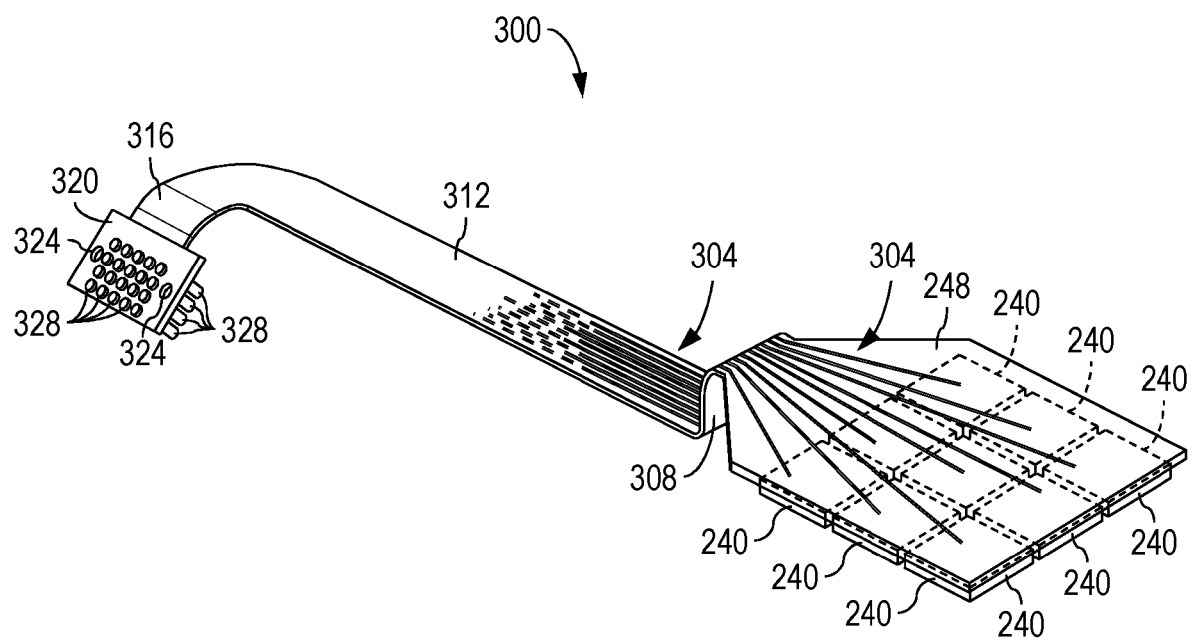
FIG. 5 is a perspective view of a portion of an example implementation of apparatus according to one or more aspects of the present disclosure.

The above-described design aspects of the active elements 240 assembled with the flexible circuit board(s) 248 also aid in permitting the elimination of pressure-compensation, such as due to their flat interfaces and the lack of wires creating relief. The flexible nature of the circuit board(s) 248 is attained by forming the circuit board(s) 248 from flexible silicon, polyimide, PEEK, transparent conductive polyester film, and/or other flexible materials. FIG. 5 is a perspective view of at least a portion of an example implementation of a circuit board assembly 300 that may be or comprise one of the circuit boards 248 depicted in FIGS. 2-4.

As shown in FIG. 5, the circuit board 248 includes a plurality of circuit traces 304. The traces 304 are schematically depicted in FIG. 5, it being understood that the actual paths of the traces 304 vary among implementations within the scope of the present disclosure. The traces 304 are connected at one end to the active elements 240. The traces 304 can contain both signal and ground paths. However, if the backing 232 is conductive or has a conductive layer on the outer surface 244, ground can be obtained directly from connection of each active element 240 to the backing 232.

The circuit board 248 includes or is connected to a portion 308 extending radially inward (i.e., toward the central member 212), another portion 312 extending longitudinally within the downhole ultrasonic measurement tool 200, and perhaps one or more additional portions 316 routing the traces 304 to one or more connectors 320. As shown in the example implementation depicted in FIG. 5, the connector 320 may include openings 324 through which fasteners (not shown) may extend for securing the connector 320 to acquisition electronics of the downhole ultrasonic measurement tool 200, as well as a plurality of pins, sockets, and/or other electrical connection means 328 that are electrically connected to corresponding ones of the traces 304.

Figure 6:
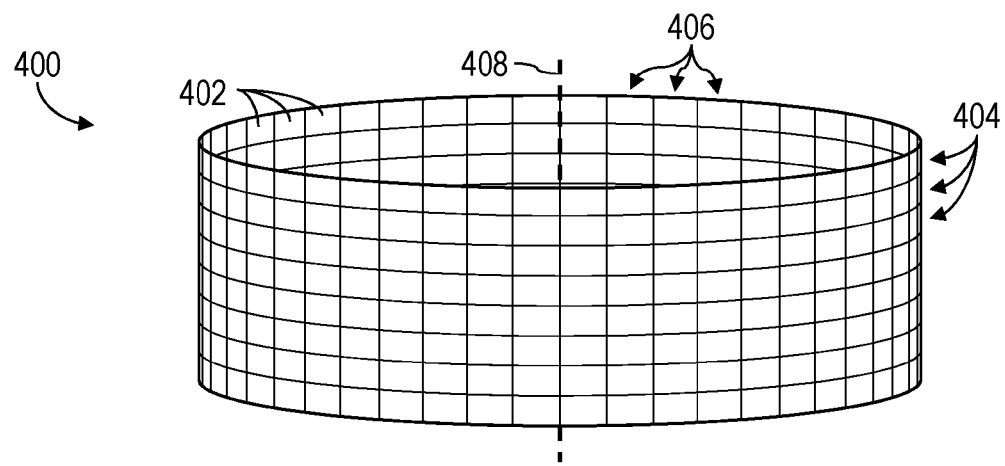
FIG. 6 is a perspective view of a portion of an example implementation of apparatus according to one or more aspects of the present disclosure.

FIG. 6 is a perspective view of at least a portion of an example implementation of active elements 402 of a phased array 400 according to one or more aspects of the present disclosure. The phased array 400 shown in FIG. 6 is an example implementation of the phased arrays described above. The phased array 400 permits obtaining azimuthal measurements relative to the borehole without rotation of the downhole ultrasonic measurement tool 200.

The example phased array 400 depicted in FIG. 6 comprises active elements 402 arranged in eight rows 404 and 48 columns 406 extending around a central axis 408. However, implementations of the phased array 400 and other phased arrays within the scope of the present disclosure may include different numbers (including one) of rows 404 and/or columns 406. The phased array 400 may be configured such that the transducer elements 402 are collectively disposed azimuthally around a substantial portion (e.g., more than 50%) of the tool, perhaps the entire periphery of the tool.

In view of the entirety of the present application, including the figures and the claims, a person having ordinary skill in the art will readily recognize that the present disclosure introduces an apparatus that includes a downhole acoustic measurement tool comprising: (A) at least one transducer operable for emitting acoustic excitation signals and/or receiving echo signals to perform downhole measurements; (B) a backing in contact with an inner surface of the at least one transducer; (C) a first structure mechanically coupled to a first housing; (D) a second structure mechanically coupled to a second housing; and (E) a longitudinally extending member comprising: (i) a first portion mechanically coupled to the first structure; (ii) a second portion mechanically coupled to the second structure, wherein at least one of the first and second structures is mechanically coupled to the member and thereby has a longitudinal degree of freedom relative to the member; and (iii) a third portion extending longitudinally through the backing between the first and second portions such that compressional longitudinal forces experienced by the first and second housings are transferred through the first and second structures and the backing.

The at least one transducer may be embedded in a substantially cylindrical outer surface of the backing.

The downhole acoustic measurement tool may further comprise an acoustically transparent canister surrounding the at least one transducer. The canister contacts an outer surface of the at least one transducer and is configured so as to exert radial forces on the at least one transducer when placed in an environment having a pressure at or higher than atmospheric pressure. In an embodiment, the canister may be permanently plastically deformed around the at least one transducer. In another embodiment, the canister may be formed of a shape memory alloy. The canister may be metallic.

The downhole acoustic measurement tool may further comprise one or more circuit boards, and the at least one transducer may be mechanically and electrically coupled to one or more substantially cylindrical inner surfaces of the one or more circuit boards. The one or more circuit boards may be flexible. When the downhole acoustic measurement tool includes a canister, the one or more circuit boards may interpose the at least one transducer and the canister.

The downhole acoustic measurement tool may further comprise an acoustic coupling layer between the at least one transducer and the canister. The acoustic coupling layer may for example be made of silicone, epoxy or polyurethane.

The member may be a hollow member to permit passage of at least one electrical conductor.

The at least one transducer may be a phased array comprising a plurality of active elements collectively disposed around a substantially cylindrical outer surface of the backing, and wherein the active elements independently and cooperatively emit acoustic excitation signals and receive echo signals to perform downhole measurements.

The downhole measurements may comprise measurements of a metal casing in a wellbore penetrating a subterranean formation.

The present disclosure also introduces an apparatus that includes a downhole acoustic tool comprising: at least one transducer operable for emitting acoustic excitation signals and/or receiving echo signals to perform downhole measurements; a backing in contact with an inner surface of the at least one transducer; and an acoustically transparent canister forming an external surface of the downhole acoustic tool in contact with an outer surface of the at least one transducer and configured so as to exert radial forces on the at least one transducer when placed in an environment having a pressure at or higher than atmospheric pressure.

The downhole acoustic tool may further comprise one or more circuit boards, and the at least one transducer may be mechanically and electrically coupled to one or more substantially cylindrical inner surfaces of the one or more circuit boards. The one or more circuit boards may be flexible.

The canister may be permanently plastically deformed around the at least one transducer.

The canister may be formed of a shape memory alloy.

The canister may be metallic.

The downhole acoustic tool may further comprise an acoustic coupling layer between the at least one transducer and the canister. The acoustic coupling layer may be made of silicone, epoxy or polyurethane for example.

The at least one transducer may be a phased array comprising a plurality of active elements collectively disposed around a substantially cylindrical outer surface of the backing, and the active elements may independently and cooperatively emit acoustic excitation signals and receive echo signals to perform downhole measurements.

The downhole measurements may comprise measurements of a metal casing in a wellbore penetrating a subterranean formation.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
    a downhole acoustic tool comprising:
        at least one transducer operable for emitting acoustic excitation signals and/or receiving echo signals to perform downhole measurements, wherein the at least one transducer comprises a plurality of active elements at a plurality of positions;
        a backing in contact with an inner surface of the at least one transducer;
        an acoustically transparent canister forming an external surface of the downhole acoustic tool; and
        an acoustic coupling layer disposed radially between the at least one transducer and the acoustically transparent canister, wherein the acoustic coupling layer extends in a circumferential direction along an outer surface of the at least one transducer overlapping the plurality of positions of the plurality of active elements, and the acoustically transparent canister contacts the outer surface of the at least one transducer and/or the acoustic coupling layer and is configured to exert radial forces on the at least one transducer and/or the acoustic coupling layer when placed in an environment having a pressure at or higher than atmospheric pressure.

2. The apparatus of claim 1, wherein the acoustically transparent canister is permanently plastically deformed around the at least one transducer.

3. The apparatus of claim 1, wherein the acoustic coupling layer is directly between and in contact with both the at least one transducer and the acoustically transparent canister.

4. The apparatus of claim 1, wherein the at least one transducer is a phased array comprising the plurality of active elements collectively disposed around a substantially cylindrical outer surface of the backing, and wherein the plurality of active elements independently and cooperatively emit acoustic excitation signals and receive echo signals to perform downhole measurements.

5. The apparatus of claim 1, wherein the downhole measurements comprise measurements of a metal casing in a wellbore penetrating a subterranean formation.

6. The apparatus of claim 1, wherein the downhole acoustic tool is configured to exclude a liquid between the at least one transducer and the acoustically transparent canister.

7. The apparatus of claim 1, wherein the acoustic coupling layer comprises a solid material that blocks air gaps between the at least one transducer and the acoustically transparent canister.

8. The apparatus of claim 1, wherein the acoustic coupling layer comprises silicone, epoxy, polyurethane, or any combination thereof.

9. The apparatus of claim 1, wherein the at least one transducer comprises a circuit board having the plurality of active elements at the plurality of positions, the acoustic coupling layer extends in the circumferential direction along the outer surface of the circuit board overlapping the plurality of positions of the plurality of active elements, the plurality of active elements are mounted along an inner surface of the circuit board, the outer surface faces toward the acoustically transparent canister, and the inner surface faces away from the acoustically transparent canister.

10. The apparatus of claim 1, wherein the outer surface of the at least one transducer comprises a curved outer surface, and the acoustic coupling layer comprises a curved layer extending along the curved outer surface.

11. The apparatus of claim 10, wherein the curved outer surface comprises a cylindrical outer surface of the at least one transducer, and the curved layer comprises a cylindrical layer.

12. The apparatus of claim 10, wherein the at least one transducer comprises a circuit board having the plurality of active elements at the plurality of positions, and the circuit board comprises a flexible circuit board including flexible silicon, polyimide, polyether ether ketone (PEEK), transparent conductive polyester, or any combination thereof.

13. The apparatus of claim 1, wherein the acoustically transparent canister comprises a shrinkable canister that is shrink fit about the acoustic coupling layer and the at least one transducer, wherein the shrinkable canister comprises an elastomer, a polymer, or a polyether ether ketone (PEEK).

14. The apparatus of claim 1, wherein the acoustically transparent canister comprises a shape memory alloy (SMA) material that changes in crystalline arrangement.

15. An apparatus comprising:
    a downhole acoustic tool comprising:
        at least one transducer comprising a plurality of active elements, wherein the plurality of active elements is configured to emit acoustic excitation signals and receive echo signals; and
        an acoustically transparent canister disposed about the at least one transducer, wherein the acoustically transparent canister, when subject to an external pressure above a threshold pressure, undergoes a permanent plastic deformation from a first configuration to a second configuration to conform to a shape of the at least one transducer.

16. The apparatus of claim 15, wherein the acoustically transparent canister comprises a metal canister.

17. The apparatus of claim 15, wherein the acoustically transparent canister in the second configuration is in direct contact with the shape of the at least one transducer about a circumference of the acoustically transparent canister.

18. An apparatus comprising:
    a downhole acoustic tool comprising:

at least one transducer comprising a plurality of active elements, wherein the plurality of active elements is configured to emit acoustic excitation signals and receive echo signals; and an acoustically transparent canister disposed about the at least one transducer, wherein the acoustically transparent canister, when subject to an external pressure above a threshold pressure, undergoes a permanent plastic deformation from a first configuration to a second configuration to apply a radial force against the at least one transducer, wherein the downhole acoustic tool is configured to exclude a liquid between the at least one transducer and the acoustically transparent canister.

19. The apparatus of claim 18, wherein the at least one transducer comprises a flexible circuit board coupled to the plurality of active elements.

20. The apparatus of claim 18, wherein the at least one transducer comprises a circuit board having an inner surface and an outer surface, the outer surface faces toward the acoustically transparent canister, the inner surface faces away from the acoustically transparent canister, and the plurality of active elements are mounted along the inner surface of the circuit board.

* * * * *